Nov. 2, 1948. R. F. FRANKLIN 2,452,918
COMMUTATOR FOR DYNAMOELECTRIC MACHINES
Filed Dec. 12, 1947
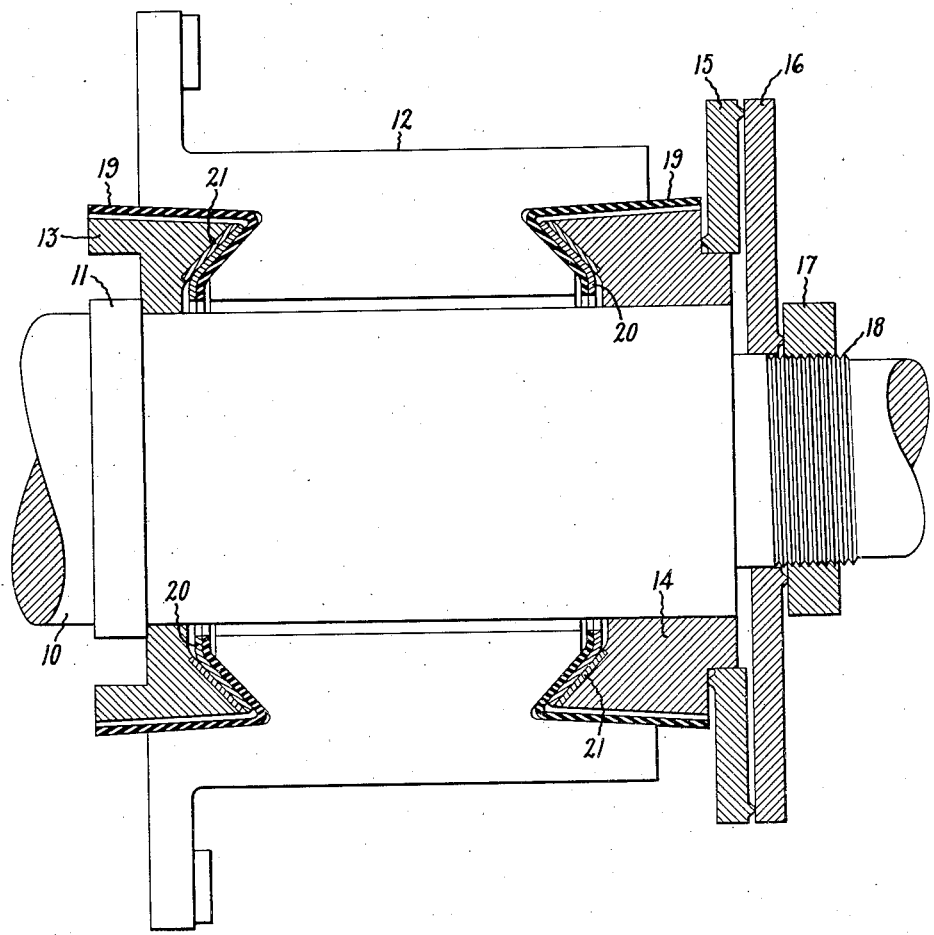
Inventor:
Raymond F. Franklin,
by *Crowell S Mack*
His Attorney.

Patented Nov. 2, 1948

2,452,918

UNITED STATES PATENT OFFICE 2,452,918

COMMUTATOR FOR DYNAMOELECTRIC MACHINES

Raymond F. Franklin, Scotia, N. Y., assignor to General Electric Company, a corporation of New York Application December 12, 1947, Serial No. 791,316

3 Claims. (Cl. 171—321)

My invention relates to dynamoelectric machine commutators and more particularly to commutators of the spring ring type. In making a commutator for a dynamoelectric machine, a general practice is to provide the commutator segments with V-shaped grooves in their ends. The segments mutually insulated from each other are then assembled in the form of a cylinder and the cylinder so formed is gripped by two clamping rings having V-shaped tongues which enter the V-shaped grooves in the segments. Conventionally the rings are separated from the copper commutator segments by a layer of mica insulation which at each end takes the shape of a cone and is often referred to as cone mica. Spring rings have long been used to place a controlled axial pressure on the V-rings which engage the ends of the segments. One or more spring rings thus afford spring take-up action which will yield to allow for the difference in the temperature coefficient of expansion of the copper segments as compared to that of the steel machine shaft. However, with such spring ring constructions the amount of expansion of the assembled segments is increased materially over the expansion that would be obtained in a more rigid construction where the internal mechanical forces of the assembly are allowed to build up to a high value. Thus with the spring ring construction the resultant expansion of the assembled segments results in appreciable movement between the segment assembly and the clamping rings. This results in an abrasive action on the cone mica which separates these members and, because there is considerable pressure between the members, the cone mica will eventually become pulverized at its surface to alter the relation between the various parts. With some types of mica this same movement between the parts causes the mica to deform through slippage, the flakes of mica riding over one another and out of place causing ultimate deformation of the assembly.

It is an object of the present invention to provide simple and inexpensive means for overcoming the above mentioned difficulties.

A further object is to provide an improved commutator construction of the spring ring type which is not subject to limitations heretofore involved when either high peripheral speed or operation at high temperatures is desired.

Broadly the means employed in the embodiment herein illustrated and described comprises a spring ring commutator construction having a metal shim fastened to the mica and interposed between the mica and one of the other parts so that relative movement between the clamping ring and the commutator bar assembly will take place between the metal shim and the nearest adjacent part other than the cone mica. Thus all movement will be through a sliding metal-to-metal contact. An additional insert of bearing metal may be used to contact the metal shim to further reduce the friction between the parts.

Further objects and advantages will become apparent and my invention will be better understood from consideration of the following description taken in connection with the single figure of the accompanying drawing in which I have shown a sectional view of a commutator assembly used with a dynamoelectric machine.

In the drawing the shaft 10 as representative of the shaft of a dynamoelectric machine is provided with a shoulder portion 11. A plurality of copper commutator segments 12 are insulated from each other and are held in place by two annular clamping V rings 13 and 14. Two annular spring rings 15 and 16, which may conveniently be made of steel, are used to yieldingly restrain the movable V-ring 14, the movement being controlled by drawing a nut 17 up on a threaded portion 18 of the shaft 10 to bias movable ring 14 inwardly against the commutator segments which are held in place at the other end by the action of stationary V-ring 13 abutting against the shoulder portion 11.

The commutator segments are insulated from the metallic clamping V-rings by two commutator cone insulators 19 interposed between the segments and the respective clamping V-ring. I have added means to assure that there will be no movement between the mica and any adjacent part by cementing to the cone mica a metallic shim 20 so that there will be relative movement only between the shim and the V-ring. In addition, the contact surface of each clamping V-ring is faced with an insert 21 of bearing metal, such as Babbitt, to further reduce the friction between the relatively movable parts. If desired, lubrication, such as oil or grease (not shown), may be added.

When the dynamoelectric machine is operating under conditions of temperature or speed change so that there is movement between the clamping rings and the commutator bar assembly, movement will take place between the metal shim and the Babbitt metal rather than at the mica insulation so that the mica will not pulverize or slip. Thus there is assurance that the commutator will not become out of round to cause excessive brush sparking and eventual burning out of the machine.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamoelectric machine commutator assembly comprising a plurality of copper commutator segments having V-shaped grooves in their ends, annular metallic clamping V-rings arranged to cooperate with said V-shaped grooves to retain said commutator segments, means including at least one spring ring arranged to yieldingly restrain said clamping rings, mica insulation interposed between the V of each clamping ring and the cooperating V at the respective end of the commutator segments, and a metal shim fastened as by cementing to one side of said mica insulation whereby relative movement between each clamping ring and the commutator segment assembly will take place between said metal shim and one of said metallic parts.

2. A dynamoelectric machine commutator assembly comprising a plurality of commutator bars, clamping ring members adapted to retain the ends of said bars, mica insulation interposed between said clamping ring members and said ends of said bars, metal shims fastened to one side of said mica insulation, and an insert of bearing metal in the metallic part nearest to each of said shims.

3. A dynamoelectric machine commutator assembly comprising a plurality of copper commutator segments having V-shaped grooves in their ends, annular metallic clamping V-rings arranged about the shaft of said machine and arranged to cooperate with said V-shaped grooves to hold said commutator segments, means including a nut threaded on said shaft and including at least one annular ring of spring-like material to yieldingly restrain said clamping rings, cone mica insulation interposed between the V-shaped groove at each end of said segments and the corresponding clamping V-ring, a shim of metal cemented to said mica so as to be interposed between said mica and the corresponding clamping V-ring, and an insert of Babbitt metal in the clamping V-ring surface adjacent said shim of metal.

RAYMOND F. FRANKLIN.

No references cited.